US008668879B2

(12) United States Patent
Kemper et al.

(10) Patent No.: US 8,668,879 B2
(45) Date of Patent: Mar. 11, 2014

(54) LOW LAYER SOLVENT EXTRACTOR

(75) Inventors: Timothy G. Kemper, Marietta, GA (US); Anibal Demarco, Buenos Aires (AR); Mauro Scardigno, Buenos Aires (AR); Marc Kellens, Mechelen-Muizen (BE)

(73) Assignee: Desmet Ballestra North America, Inc., Marietta, GA (US)

( * ) Notice: Subject to any disclaimer, the term of this patent is extended or adjusted under 35 U.S.C. 154(b) by 0 days.

(21) Appl. No.: 13/638,039

(22) PCT Filed: Mar. 30, 2011

(86) PCT No.: PCT/US2011/000567
§ 371 (c)(1),
(2), (4) Date: Sep. 28, 2012

(87) PCT Pub. No.: WO2011/126546
PCT Pub. Date: Oct. 13, 2011

(65) Prior Publication Data
US 2013/0022516 A1 Jan. 24, 2013

Related U.S. Application Data

(60) Provisional application No. 61/341,454, filed on Mar. 31, 2010.

(51) Int. Cl.
*B01D 11/02* (2006.01)
*A61L 2/00* (2006.01)
(52) U.S. Cl.
USPC ........... 422/261; 422/268; 422/274; 422/285; 422/292; 422/300

(58) Field of Classification Search
USPC .......... 422/261, 268, 274, 285, 292, 300, 307
See application file for complete search history.

(56) References Cited

U.S. PATENT DOCUMENTS

| 2,733,136 | A |   | 1/1956 | Andrews |
|---|---|---|---|---|
| 2,907,640 | A | * | 10/1959 | Konig .......................... 422/268 |
| 4,255,346 | A |   | 3/1981 | Kock |
| 4,901,635 | A |   | 2/1990 | Williams |
| 5,992,050 | A |   | 11/1999 | Kemper et al. |

FOREIGN PATENT DOCUMENTS

| EP | 0255555 | 3/1990 |
|---|---|---|
| WO | 99/43999 | 9/1999 |

* cited by examiner

*Primary Examiner* — Monzer R Chorbaji
(74) *Attorney, Agent, or Firm* — Wegman, Hessler & Vanderburg

(57) ABSTRACT

An apparatus for the solvent extraction of oil-bearing materials having a two-deck, loop-shaped housing is provided. The apparatus has a feed inlet for the materials and an outlet for the solvent-wet extracted materials. An assembly of two or more endless chains are connected by a series of baffle plates and driven by a set of two or more drive sprockets that transport the materials from the feed inlet to the outlet over an upper deck, along an elbow and over a lower deck the end of which serves as a draining section, both of which decks retain the materials but let miscella pass through. Inside the housing, the materials are sprayed with solvent that percolates through the materials and is collected below the decks and sprayed again onto the materials in a counter-current manner.

22 Claims, 8 Drawing Sheets

LOW LAYER SOLVENT EXTRACTOR

CROSS REFERENCE TO RELATED APPLICATION

This application claims the priority benefit of U.S. Provisional Patent Application Ser. No. 61/341,454 filed Mar. 31, 2010.

BACKGROUND OF THE INVENTION

1. Field of the Invention

This invention relates generally to equipment for use in the extraction of oil from oleaginous matter using an organic solvent.

2. Description of Related Art

The production of crude oil from oleaginous matter, such as but not limited to soybeans, rapeseed, sunflower seed, peanuts, cottonseed, palm kernels, and corn germ, starts with the mechanical and thermal preparation of the oleaginous matter to remove external coverings and expose the cellular inner structure containing the oil. If the oil content of the oleaginous matter is less than typically 30% by weight, the prepared oleaginous matter goes directly to the solvent extractor in the form of a flake or pellet. If the oil content of the prepared oleaginous matter is greater than 30% by weight, a portion of the oil contained in the oleaginous matter is removed via pressure in a mechanical screw press and the pressed oleaginous matter goes to the solvent extractor in the form of a press cake.

The prepared oleaginous material in the form of flakes, pellets or cake is conveyed from the seed preparation process to the solvent extraction process and enters the solvent extractor where it is treated with an organic solvent, such as but not limited to n-hexane and its isomers, to solvent extract the oil.

The solvent extractor conveys the prepared material from its inlet to its exit, providing the prepared material approximately 30 minutes to 120 minutes of residence time. While the material is being conveyed forward, miscella (the solution of oil in the extraction solvent) is washed down through the layer of material to wash out the vegetable oil. Each successive miscella wash is of a decreasing concentration of vegetable oil. After four to twelve miscella washes, the material is washed once more by fresh solvent, ending the extraction process. Before the material leaves the extractor, it is allowed to gravity drain to reduce the amount of retained solvent. The extracted, spent material then falls into the extractor discharge and is made to leave the apparatus. The miscella with the highest concentration of vegetable oil also exits the apparatus to a full-strength miscella tank.

For the solvent extraction of prepared oleaginous material, two main types of extractors are commonly used. There is the so-called immersion extractor employing a deep bed of material that is typically greater than 2 m high, and there is the percolation extractor employing a shallow bed of material that is typically less than 1 m high. In both extractor types, the solvent and miscella pass through the material layer in a vertically downward manner in multiple countercurrent passes. In the immersion extractor, the solvent and miscella flow rates are sufficiently high to displace all vapor between the particles of material resulting in miscella or solvent pooling above the layer, and in the percolation extractor the solvent and miscella flow rates are sufficiently low to cascade the solvent and miscella through the material without displacing all vapor between the particles of material.

An early embodiment of the immersion extractor has been disclosed in U.S. Pat. No. 2,790,708. These early embodiments had capacities up to 250 tons per day but subsequently, much larger immersion extractors have been developed as disclosed for instance in U.S. Pat. No. 3,860,395. According to an article by one of the inventors (K. Weber, *J. Am. Oil Chem. Soc.*, volume 58, pages 538-539, 1981), its daily capacity had been increased to 3000 tons.

Such immersion extractors have been found to operate satisfactorily with soybean flakes but when the material to be extracted contains more fines, the rate at which the solvent passes downwards through the bed of material is reduced significantly. Because a certain number of passes is required to attain a baseline extraction efficiency, these fines lower the extractor capacity. In that case a more shallow bed is preferred. This has led to the development of a type of extractor according to U.S. Pat. No. 2,907,640 which discloses an apparatus comprising a revolvably mounted substantially liquid-permeable endless belt having a substantially horizontally extending portion, a separate chain of upright, open bottomed, box-like frames movable along with the horizontally extending portion of the belt subdividing the same into framed flexibly linked segments, means for passing a solid material on to one end of the horizontally extending portion of the belt for movement therealong, means for removing solid material coming off the other end of the horizontally extending portion of the belt, means for passing solvent in contact with material passing along the horizontally extended portion of the belt, means for collecting at least a portion of the solvent after the contacting and means for recycling the same in contact with material passing along the horizontally extending portion of the belt, means for the belt and means for revolving the chain of frames at substantially the same velocity as the endless belt. U.S. Pat. No. 2,907,640 also discloses an extractor comprising a second revolvably mounted substantially liquid permeable endless belt onto which material falls from the first belt and travels therealong. Since this second belt is located within the same housing, it increases the extraction capacity of the apparatus.

Since the publication of U.S. Pat. No. 2,907,640, this type of shallow bed, percolation extractor has been much improved. It is extremely heavy, upright, open bottomed, box-like frames movable along with the horizontally extending portion of the belt subdividing the same into framed flexibly linked segments have been replaced by a much lighter assembly of chains kept apart by baffles that also ensure the forward movement of the material being extracted. This much lighter construction reduces power requirement and investment cost and also eliminates the channeling of solvent along internal vertical surfaces. A description of such a continuous loop extractor can be found in the *Practical Handbook of Soybean Processing and Utilization* (Editor D. R. Erickson, AOCS Press, Urbana, Ill. and United Soybean Board, St Louis Mo., pages 82 and 84, 1995).

Solvent extraction equipment used in processing plants is commonly judged by its mechanical reliability and related safety of operation and by the residual oil content (ROC) of the ensuing meal because lowering the ROC has great financial consequences. An extractor with a daily capacity of 3000 tons will process about 1 million tons per annum and, in the case of soybeans, produce some 0.75 million tons of meal. A reduction of 0.1% by weight in ROC then corresponds to 750 tons of oil per annum, and since the selling price difference between crude soybean oil and the meal can reach US $500 per ton, even this small reduction leads to a net saving of at least US $375,000 per annum.

There are six parameters that affect the ROC performance of the solvent extractor apparatus. These six parameters are:

contact time, particle thickness, extractor temperature, miscella flow rate, number of miscella stages and solvent retention.

Contact time. The total time that the oleaginous material spends in the extractor is the residence time. Residence time can be subdivided into wash time and drain time. Wash time is the time the oleaginous material spends under the washing nozzles of the extractor, and drain time is the time the oleaginous material spends draining prior to discharge. Wash time can be further subdivided into contact time and dormant time. Contact time is the time a particle of oleaginous material spends in the washing zone of the extractor where the particle is in contact with miscella. Extraction only takes place during contact time. Adequate contact time is critical for maximizing extraction efficiency and minimizing the amount of residual oil remaining in the oleaginous material.

Particle thickness. Various oleaginous materials are prepared for extraction using different process steps, but with virtually all oleaginous materials, one process step is flaking. The principle purpose of flaking is to reduce the thickness of the oleaginous material and thereby reduce the distance and number of cell walls that miscella needs to diffuse through to reach the oil bodies. By reducing particle thickness, desired ROC results can be achieved with less contact time.

Extractor Temperature. As the temperature of the miscella increases, its rate of diffusivity through the cell walls of the oleaginous material increases. Since the prepared oleaginous material enters the extractor at approximately 60° C., and both the oil and meal fractions are heated to above 100° C. in subsequent process steps, there is no extra energy required for operating the extractor at a warm temperature. As a result, optimizing extraction results requires operating the extractor as warm as safely possible.

Miscella Flow Rate. The miscella flow rate is the maximum volumetric flow rate of miscella that can flow down through the bed of material per unit of material bed surface area. The miscella flow rate is determined by the screen below the bed of material. The material bed is approximately 40 to 50 percent solids and 50 to 60 percent void space. Therefore, as the miscella is moving downward, it has 50 to 60 percent open area. The screen under the material bed has less open area, and therefore the material interface with the screen creates the greatest restriction to flow. As downward miscella flow reaches the miscella flow rate, the material/screen interface reaches its maximum flow rate and begins restricting the flow of miscella. All void spaces between the oleaginous material particles fill with miscella as the solvent vapors are pushed out the top of the material bed. At each washing stage of the extractor, miscella needs to have an opportunity to wash the material bed, pass through the screen, and then enter the proper miscella collection receptacle underneath the material bed. For a given extractor and prepared oleaginous material, each miscella collection receptacle is carefully calculated to be located a specific distance after its washing nozzle to maintain separation between washing stages.

Number of Miscella Stages. In most extraction applications, the prepared material contains approximately 20% oil by weight and the goal is to reduce the oil content to approximately half of one percent by weight. The minimum number of miscella stages can be calculated for a given solvent to material ratio. For an energy competitive distillation system, the solvent to material ratio should be maintained below one. To achieve a ratio of one or less, the minimum number of stages required can be calculated to be four stages. A four-stage extractor is sufficient in a theoretical sense, but leaves no contingency for lack of achieving equilibrium at each miscella stage. The more miscella stages, the greater the theoretical extraction efficiency will be. In practice, however, if an extractor is designed with too many miscella stages, this causes the individual stages to have insufficient contact time to reach equilibrium so that adding further stages will not reduce ROC. Commercially, most extractors have in the range of five to ten miscella stages.

Solvent Retention. After the washing zone of the extractor, the extracted material is left to gravity drain. This gravity drain time is generally in the range of five to twenty minutes. After gravity drainage, the solvent retained by the extracted material will generally be in the range of 25 to 35 percent. The solvent retained by the flakes is actually weak miscella. This miscella typically contains approximately half of one percent oil. In the meal desolventizer, the solvent is evaporated, leaving behind the traces of oil, often referred to as the residual oil. In order to minimize the residual oil left in meal, it is important to minimize the amount of weak miscella carried forward to the meal desolventizer.

SUMMARY OF THE INVENTION

In one aspect, it has been found that a reduced residual oil content of the meal produced during oil milling can be attained by an apparatus for the solvent extraction of oil-bearing materials comprising a two-deck, loop-shaped housing with an inlet for the materials and an outlet for the solvent-wet extracted materials, inside which housing an assembly of two or more endless chains that are connected by a series of baffles and driven by a set of two or more sprocket wheels transports the materials from the inlet to the outlet over an upper deck, along an elbow and over a lower deck the end of which serves as a draining section, both of which decks retain the materials but let miscella pass through, and inside which housing the materials are sprayed with solvent that percolates through the materials and is collected below the decks and sprayed again onto the materials in a counter-current manner. In one embodiment, the apparatus further includes means to forward the oil-bearing materials being extracted from the upper deck to the lower deck through a chute before the materials reach the elbow. In another embodiment, the apparatus further includes means of positioning the symmetrical chain with respect to the lower deck in the same way as the chain is positioned with respect to the upper deck; use of symmetrical chains and concomitant means of positioning the symmetrical chains with respect to the lower deck in the same way as the chains are positioned with respect to the upper deck. In another embodiment, the apparatus further includes means to create and maintain a pressure drop over the material being transported along the draining section.

In one aspect of the present invention, a low layer solvent extractor is provided. The low layer solvent extractor includes a housing (12) as well as an upper deck (18) and a lower deck (24) located within the housing (12). The upper deck (18) has a first upstream end (20) and a first downstream end (22), and the lower deck (24) has a second upstream end (26) and a second downstream end (28). The low layer solvent extractor also includes an elbow (30) located within the housing (12), wherein the elbow (30) extending between the first downstream end (22) and the second upstream end (26). A return (32) is located within the housing (12), and the return (32) operatively extends between the first upstream end (20) and the second downstream end (28). The upper deck (18), elbow (30), lower deck (24), and return (32) form a loop. A feed inlet (40) is positioned adjacent to the first upstream end (20), wherein oleaginous material (56) is introducible to the upper deck (18) through the feed inlet (40). A chute (58) is operatively connecting the upper deck (18) and the lower deck (24), wherein the oleaginous material (56) is transferrable from the upper deck (18) to the lower deck (24) through the chute (58). An outlet (66) is positioned adjacent to the second downstream end (28), wherein the oleaginous material (56) exits the housing (12) through the outlet (66). A chain assembly (42) is disposed along the loop for guiding the oleaginous material (56) between the feed inlet (40) and the outlet (66). A drive system (86) is operatively connected to the chain assembly (42) for driving the chain assembly (42) about the loop.

In another aspect of the present invention, a low layer solvent extractor is provided. The low layer solvent extractor includes a housing as well as an upper deck (18) and a lower deck (24), wherein the upper deck (18) has a first upstream end (20) and a first downstream end (22) and the lower deck (24) has a second upstream end (26) and a second downstream end (28). The low layer solvent extractor also includes an elbow (30), the elbow (30) extending between the first downstream end (22) and the second upstream end (26). The low layer solvent extractor further includes a return (32), the return (32) is operatively extending between the first upstream end (20) and the second downstream end (28), wherein the upper deck (18), the elbow (30), the lower deck (24), and the return (32) form a loop. A feed inlet (40) is positioned adjacent to the first upstream end (20), wherein oleaginous material (56) is introducible to the upper deck (18) through the feed inlet (40). A chute (58) is operatively connecting the upper deck (18) and the lower deck (24), wherein said oleaginous material (56) is transferrable from the upper deck (18) to the lower deck (24) through the chute (58). An outlet (66) is positioned adjacent to the second downstream end (28), wherein said oleaginous material (56) exits the lower deck (24) through the outlet (66). The low layer solvent extractor also includes a chain assembly (42) for guiding the oleaginous material (56) between the feed inlet (40) and the outlet (66). The chain assembly (42) includes a plurality of endless chains (44) extending along the entire loop and a plurality of spaced-apart baffle plates (46). Each baffle plate (46) extends between at least two adjacent chains (44). A drive system (86) is operatively connected to the chain assembly (42) for driving the chain assembly (42) along the loop.

In still another aspect of the present invention, a low layer solvent extractor is provided. The low layer solvent extractor includes a housing (12) as well as an upper deck (18) and a lower deck (24), wherein the upper deck (18) has a first upstream end (20) and a first downstream end (22) and the lower deck (24) has a second upstream end (26) and a second downstream end (28). The low layer solvent extractor also includes an elbow (30), the elbow (30) extending between the first downstream end (22) and the second upstream end (26). The low layer solvent extractor further includes a return (32), the return (32) operatively extending between the first upstream end (20) and the second downstream end (28), wherein the upper deck (18), the elbow (30), the lower deck (24), and the return (32) form a loop. A feed inlet (40) is positioned adjacent to the first upstream end (20), wherein oleaginous material (56) is introducible to the upper deck (18) through the feed inlet (40). A chute (58) is operatively connecting the upper deck (18) and the lower deck (24), wherein the oleaginous material (56) is transferrable from the upper deck (18) to the lower deck (24) through the chute (58). An outlet (66) is positioned adjacent to the second downstream end (28), wherein the oleaginous material (56) exits the lower deck (24) through the outlet (66). The low layer solvent extractor also includes a chain assembly (42) for guiding the oleaginous material (56) between the feed inlet (40) and the outlet (66). A drive system (86) is operatively connected to the chain assembly (42) for driving the chain assembly (42) about the loop. A drainage section (82) is located within the lower deck (24) adjacent to the outlet. A fan (84) is located within the drainage section (82) for generating a pressure differential across the oleaginous material (56) within the drainage section (82).

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges included herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements, but may include other elements not expressly listed or inherent to such process, method article or apparatus.

The singular forms "a," "an" and "the" include plural referents unless the context clearly dictates otherwise.

Figure 1:
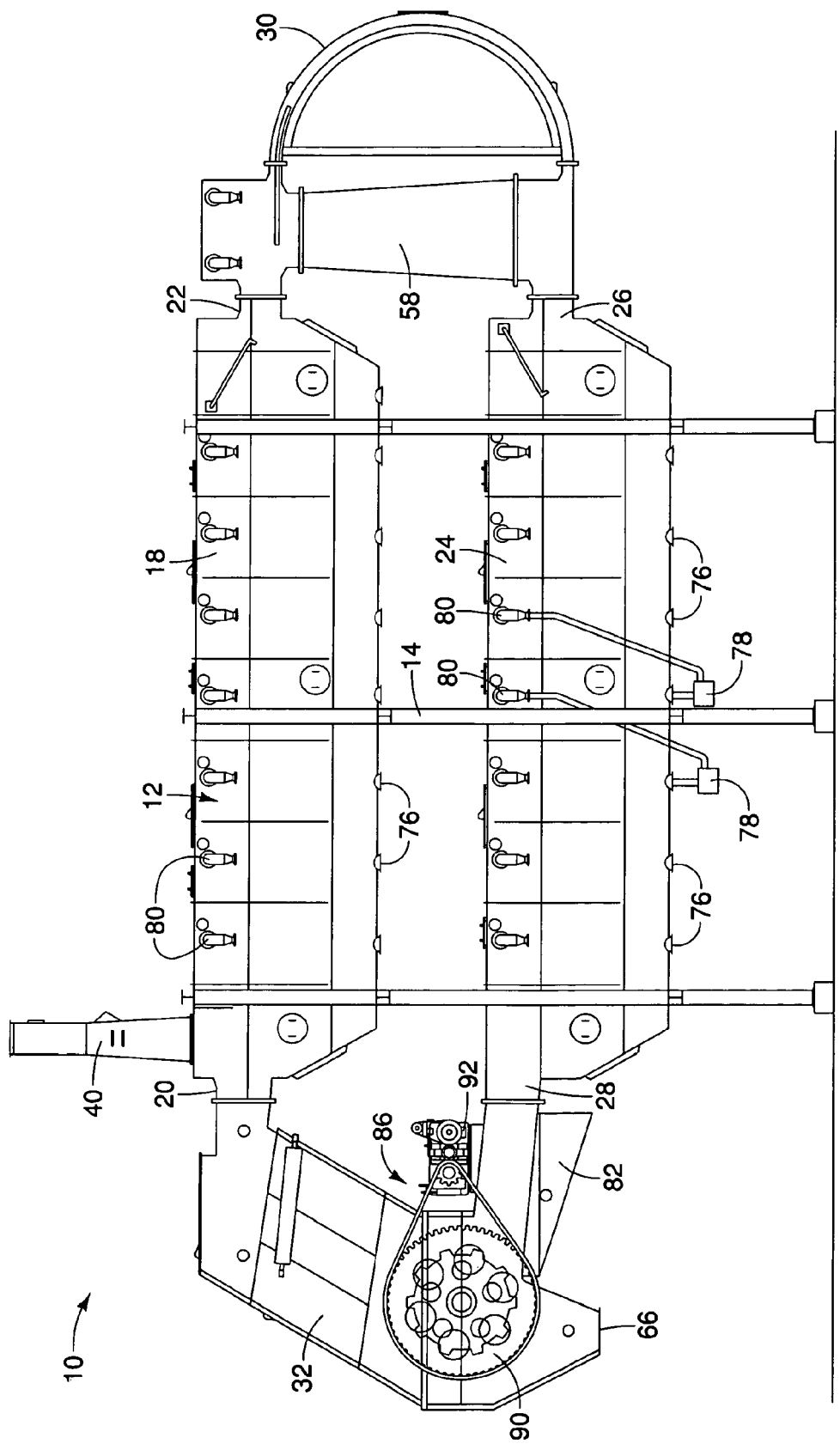
FIG. 1 is a side view of an embodiment of a solvent extractor of the present invention.
Figure 2:
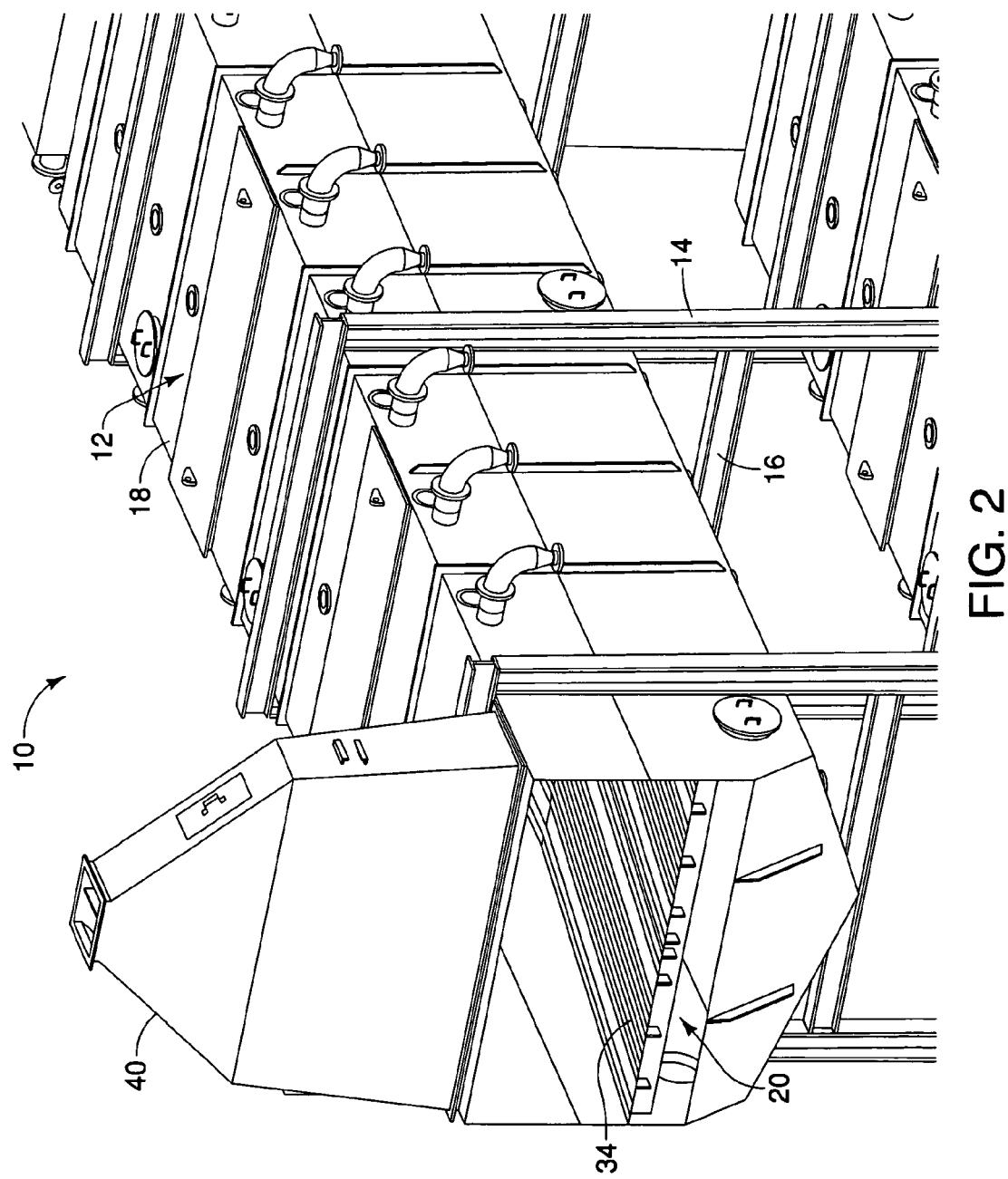
FIG. 2 is a top perspective view of a portion of the low layer solvent extractor shown in FIG. 1.

Turning now to FIGS. 1-2, an embodiment of a low layer solvent extractor 10 includes a housing (12) having a generally lateral loop-shaped design inside which the oil-bearing, vegetable material is extracted with an organic solvent such as but not limited to n-hexane and its isomers, ethanol or other alcohols. The housing (12) is supported by at least two and preferably three frames that consist of two upright members (14) that are connected by at least two and preferably four crossbars (16) that extend between the upright members (14) and support and/or surround the housing (12). The housing (12) includes an upper deck (18) having an upstream end (20) and a downstream end (22) and a lower deck (24) having an upstream end (26) and a downstream end (28). The housing (12) further includes an elbow (30) operatively connecting the downstream end (22) of the upper deck (18) and the upstream end (26) of the lower deck (24) as well as a return (32) operatively connecting the downstream end (28) of the lower deck (24) and the upstream end (20) of the upper deck (18) to form a continuous loop. Wet meal is input into the low layer solvent extractor (10) through a feed inlet (40) located adjacent to the upstream end (20) of the upper deck (18), and the wet meal exits through the outlet (66) located adjacent to the downstream end (28) of the lower deck (24).

Both the upper and lower decks (18, 24) include a floor (34) extending the length thereof between the upstream ends (20, 26) and the downstream ends (22, 28) of the respective deck, as shown in FIGS. 3-6. In an embodiment, each floor (34) is substantially planar between opposing ends of the deck (18, 24). In another embodiment, the first portion of the floor (34) of the upper and lower decks (18, 24) is angled downwardly lengthwise from the upstream end (20, 26) toward the downstream end (22, 28). As shown in the embodiment illustrated in FIG. 3, the floor (34) is angled slightly downwardly from the upstream end (20) of the upper deck (18), then levels out to a substantially horizontal orientation, and then angles slightly upwardly to the downstream end (22). It should be understood by one of ordinary skill in the art that the floor (34) of the lower deck (24) can have substantially the same longitudinal shape and/or angle as the floor (34) of the upper deck (18) or a different longitudinal shape.

Figure 6:
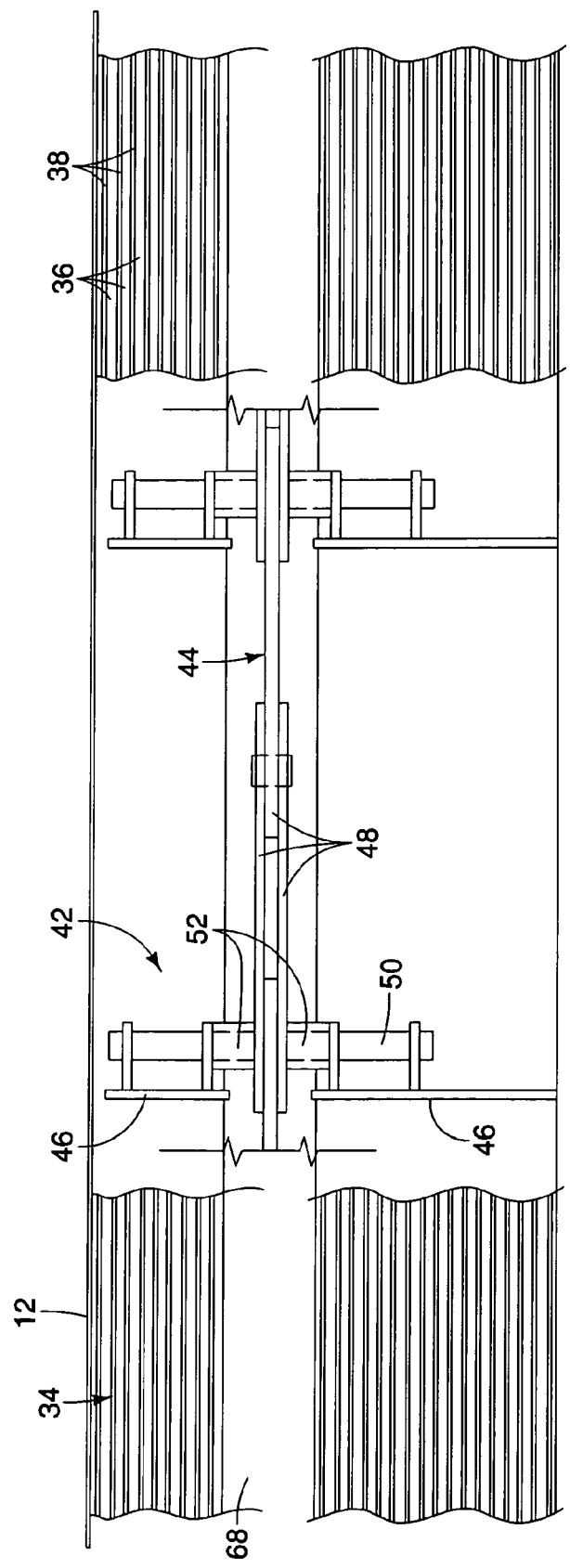
FIG. 6 is a top view of the chain assembly portion shown in FIG. 5.

In an embodiment, the floor (34) of both the upper deck (18) and the lower deck (24) includes a plurality of elongated bars (36) arranged in a parallel relationship, wherein the bars (36) are oriented longitudinally along the length of the upper and lower decks (18, 24), as shown in FIG. 6. In an embodiment, the bars (36) extend the entire length of the upper and lower decks (18, 24) between the upstream ends (20, 26) and the downstream ends (22, 28). In another embodiment, a plurality of bars (36) are positioned end-to-end to extend the entire length of upper and lower decks (18, 24). The bars (36) are arranged in a spaced-apart manner such that there is a gap (38) between adjacent elongated bars (36). In an embodiment, the gaps (38) between the elongated bars (36) are between about one-sixteenth of an inch (0.0625 in) and about one-eighth of an inch (0.125 in.). In another embodiment, the gaps (38) between the elongated bars (36) are about eight-hundredths of an inch (0.080 in) wide. It should be understood by one of ordinary skill in the art that the gaps between the bars can all be the same width, or the width of the gaps can vary between successive bars or even along the length of the gap. The gaps (38) are configured to allow the miscella to pass through the floor (34) and be collected after it exits the material being processed. It is generally understood that a portion of the material being processed will also fall through these gaps (38) between the bars (36). In an embodiment, when the miscella is collected beneath one section of the floor (34) it is then sprayed onto the top of the section of material upstream from that section such that any material in the miscella will likely be added to the top of the section of the material upstream from where it passed through the floor (34). In an embodiment, the bars (36) have a cross sectional profile with a larger width at the top than at the bottom which facilitates the clearing of any material that might inadvertently have been lodged in the gaps (38). Such a floor construction has been disclosed in U.S. Pat. No. 5,992,050 for use in a desolventiser. In this application, a gas flows upwardly from underneath a deck supporting a vegetable material being desolventised, but unexpectedly, a similar deck construction has been found to be equally useful for an application in which a liquid flows downwardly through a deck supporting a solvent-wet vegetable material.

As best seen in FIGS. 1-2, a feed inlet (40) is operatively connected to the housing (12) adjacent to the upstream end (20) of the upper deck (18). In an embodiment, the feed inlet (40) is positioned above the floor (34) of the upper deck (18). Generally, the feed inlet (40) includes an opening at one end through which the feed is introduced and another opening at the opposing end of the feed inlet (40) through which the feed is introduced into the housing (12). In an embodiment, the feed inlet (40) allows gravity to move the feed therethrough, and the feed inlet (40) continually holds a material level deeper than that which is maintained in the extractor. The feed is an oil-bearing, vegetable material that preferably has already undergone a pre-treatment to expose the cells. The vegetable materials that have been found to be amenable for treatment in the apparatus according to the invention comprise flaked oilseeds like soybean flakes that may have undergone a live steam treatment according to U.S. Pat. No. 4,255, 346 or an expander treatment according to U.S. Pat. No. 4,901,635. Because of its normally high fines content, rice bran is also preferably treated with an expander before being extracted. Press cakes from oilseeds like rapeseed or sunflower seed and press cake from germs like corn germ also constitute amenable vegetable material, whereby this press cake can be fed to the apparatus according to the invention as such, or after having been granulated or pelletized. Inside the housing (12), the oil bearing vegetable material being fed through the feed inlet (40) is spread over the floor (34) of the upper deck (18).

In the embodiment illustrated in FIG. 1, a chute (58) extends between the downstream end (22) of the upper deck (18) and the upstream end (26) of the lower deck (24). The chute (58) is a generally hollow member and is configured to allow the oleaginous material to be transferred from the upper deck (18) to the lower deck (24) without having to push the material through the elbow (20) as will be explained below.

Figure 5:
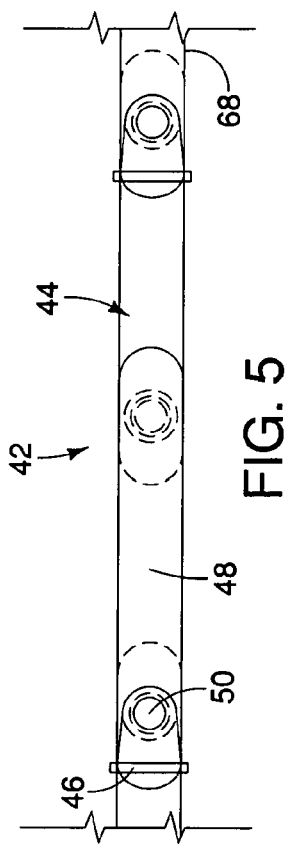
FIG. 5 is a side view of a portion of a chain assembly.

Turning now to FIGS. 5-6, the oleaginous material is moved along the floors (34) upper and lower decks (18, 24) by a chain assembly (42) comprising a pair of opposing endless chains (44) and a plurality of baffle plates (46) that extend between the opposing chains (44). The chains (44) are disposed adjacent to the opposing side walls of the housing (12) on both sides of the floor (34) of the upper and lower decks (18, 24). As shown in FIGS. 5-6, the chain (44) includes a plurality of links (48) connected end-to-end to form a continuous loop. A pin (50) operatively connects adjacent links (48) such that links (48) can articulate around the pins (50) at both ends of each link (48). In the exemplary embodiment shown in FIG. 6, the chain (44) includes a first link having a portion of a pair of spaced-apart links (48) surrounding a portion of a single link (48) with a pin (50) extending through all three aligned links (48), and the opposing portion of the single link (48) is surrounded by another pair of spaced-apart links (48) with a pin extending through all three link (48), thereby forming a continuous chain of links. In an embodiment, the baffle plates (46) are connected to the chains (44) by way of an elongated pin (50) that extends through the connecting point of the adjacent links (48) as well as through a portion of the baffle plate (46) such that the pin (50) is oriented substantially perpendicular to the longitudinal length of the chain (44). A bushing (52) is positioned on the outwardly-directed edge of the links (48) to ensure that the baffle plates (46) are spaced apart from the links (48). The elongated pin (50) extends through the bushings (52), thereby allowing the bushings (52) to be rotatable about the pin (50).

In an embodiment, the chain (44) is configured to be spaced apart from the floor (34) of the upper and lower decks (18, 24). In another embodiment illustrated in FIGS. 5-6, the floor (34) includes a wear plate (68) extending the length thereof. Although FIG. 6 shows only a portion of the floor (34) and only half of the lateral housing (12) portion, a wear plate (68) is configured to be disposed below each chain (44) of the chain assembly (42). Each wear plate (68) is configured to be raised slightly with respect to the bars (36) of the floor (34), and the downwardly-directed surface of each link (48) is configured to slide across the wear plate (68). As shown in FIG. 5, the vertical height of each baffle plate (46) extends slightly above and slightly below the upper and lower surface of the links (48) such that the bottom surface of each baffle plate (46) slides across the bars (36) of the floor (34) as the links (48) slide across the wear plate (68). In an embodiment, the wear plates (68) are formed of hardened steel. It should be understood by one of ordinary skill in the art that the wear plates (68) can be formed of any material sufficient to allow the links (48) of the chain assembly (42) to slide along smoothly.

Figure 4:
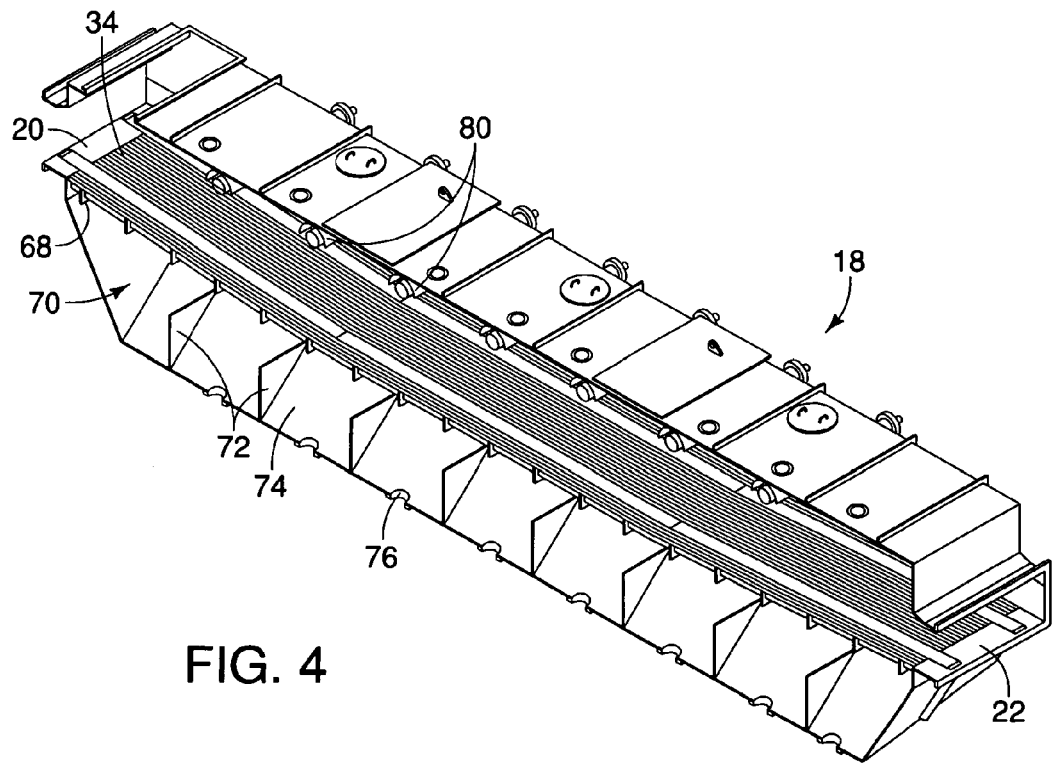
FIG. 4 is a cross-sectional top perspective view of the upper deck shown in FIG. 3.

As shown in FIGS. 4-5, the chain assembly (42) also comprises a plurality of spaced-apart baffle plates (46). In an embodiment, the baffle plates (46) are attached to an end of each successive link (48) in both opposing chains (44) such that the baffle plates (46) are spaced apart along the length of the floor (34) of the upper and lower decks (18, 24) about the same distance as the length of a link (48) in the chains (44). In another embodiment, the baffle plates (46) are attached to an end of alternating links (48) in both opposing chains (44) such that the baffle plates (46) are spaced apart along the length of the floor (34) of the upper and lower decks (18, 24) about twice the length a link (48) in the chains (44). It should be understood by one of ordinary skill in the art that the baffle plates (46) can be spaced apart from each other in any manner, including but not limited to constant spacing therebetween, random spacing therebetween, or any pattern of different spacing therebetween. In an embodiment, each baffle plate 46 extends between the ends of aligned links (48) on both opposing chains (44). In an embodiment, the baffle plates (46) are mounted symmetrically with respect to the chains (44). In other words, as shown in the side view of FIG. 5, each baffle plate (46) extends above the top surface of the link (48) the same distance that the baffle plate (46) extends below the bottom surface of the link (48).

In prior art loop extractors, these baffle plates tended to be quite wide and may even extend above the height of the bed of material, but quite unexpectedly, it has now been found that much shorter baffle plates (46) are fully effective in pushing forward the material being extracted. An advantage of the size of the baffle plates (46) described herein is that the shorter and smaller baffle plates are effective in pushing the material bed through the entire low layer solvent extractor (10) while requiring much less energy to do so compared to prior art baffle plates. This is particularly evident in that the baffle plates (46) shown in the illustrated embodiments contact and provide a moving force to only the bottom portion of the material bed between successive baffle plates (46). Because the material being pushed is wet, as the bottom portion of the material bed is pushed along the floors (34) of the upper and lower decks (18, 24), the top portion of the material bed that is not in contact with a baffle plate (46) is pulled along the floors (34) by the bottom portion of the material bed against which the baffle plates (46) are contacting and pushing. In fact, this material only requires a forward-moving force where it touches the floors (34) of the upper and lower decks (18, 24), and the material in the upper parts of the bed is then moved by material underneath. As explained below, because the wet material is not pushed through the elbow (30), this means that the elbow can be much narrower than according to the known art, and the baffle plates (46) can be of a much more simple construction, symmetrical, and less heavy, which also saves on power. Sufficient rigidity of baffle plates (46) can for instance be realized by employing baffles with backing supports. The proposed chain-baffle design allows support of the chain on the floors (34) of the upper as well as lower decks (18, 24) which improves the overall rigidity of the conveying system.

Figure 3:
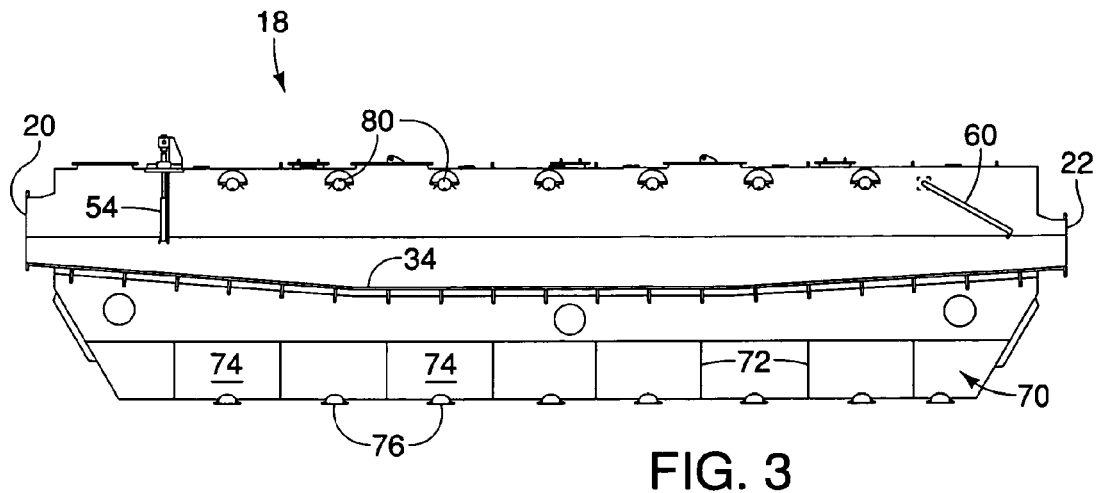
FIG. 3 is a cross-sectional side view of an upper deck of deck of the low layer solvent extractor shown in FIG. 1.

In an embodiment, a leveling device or register plate (54) is disposed widthwise across the bed (transverse to the longitudinal length of the floor (34) of the upper deck (18)), as shown in FIG. 3. The register plate (54) is positioned adjacent to the feed inlet (40) and is located downstream therefrom. This register'plate (54) can be a simple vertical plate that sets the material layer depth by limiting the height of material that can be pulled thereunder by the chain assembly (42). The vertical height of the register plate (54) relative to the floor (34) can also be adjustable from outside the housing (12). In an embodiment, the speed of movement of the chain assembly (42) is automatically adjusted to maintain a constant level of material in the feed inlet when the register plate (54) is adjusted, with such automation being known to those skilled in the art. In another embodiment, the rate of movement of the chain assembly (42), comprising the chains (44) and baffle plates (46), along floors of the upper and lower decks (18, 24) is variable for a given flow rate of prepared oleaginous material into the feed inlet (40).

Adjustment of the register plate (54) height and speed of the chain assembly (42) through the loop of the housing (12) provides a desired depth of the material bed through the low layer solvent extractor (10). Depending on the quality of feed and with proper adjustment of the register plate (54) height and chain assembly (42) speed, the height of the material bed throughout the upper and lower decks (18, 24) can be between about three hundred to two thousand millimeters (300-2000 mm) deep. In another embodiment, the height of the material bed throughout the housing (12) can be regulated by the adjustment of the register plate (54) and speed of the chain assembly (42) to be between about six hundred millimeters (600 mm) and about one thousand millimeters (1000 mm). The adjustable depth of the material bed provides at least another distinct advantage over prior art solvent extractors, because those solvent extractors known in the art force the material through the elbow which limits the height of the material bed due to the walls of the elbow, whereas in the present invention the height of the material bed is not so limited because the material is transferred from the upper deck (18) to the lower deck (24) through the chute (58) instead of the material (56) passing through the elbow (30).

Figure 7:
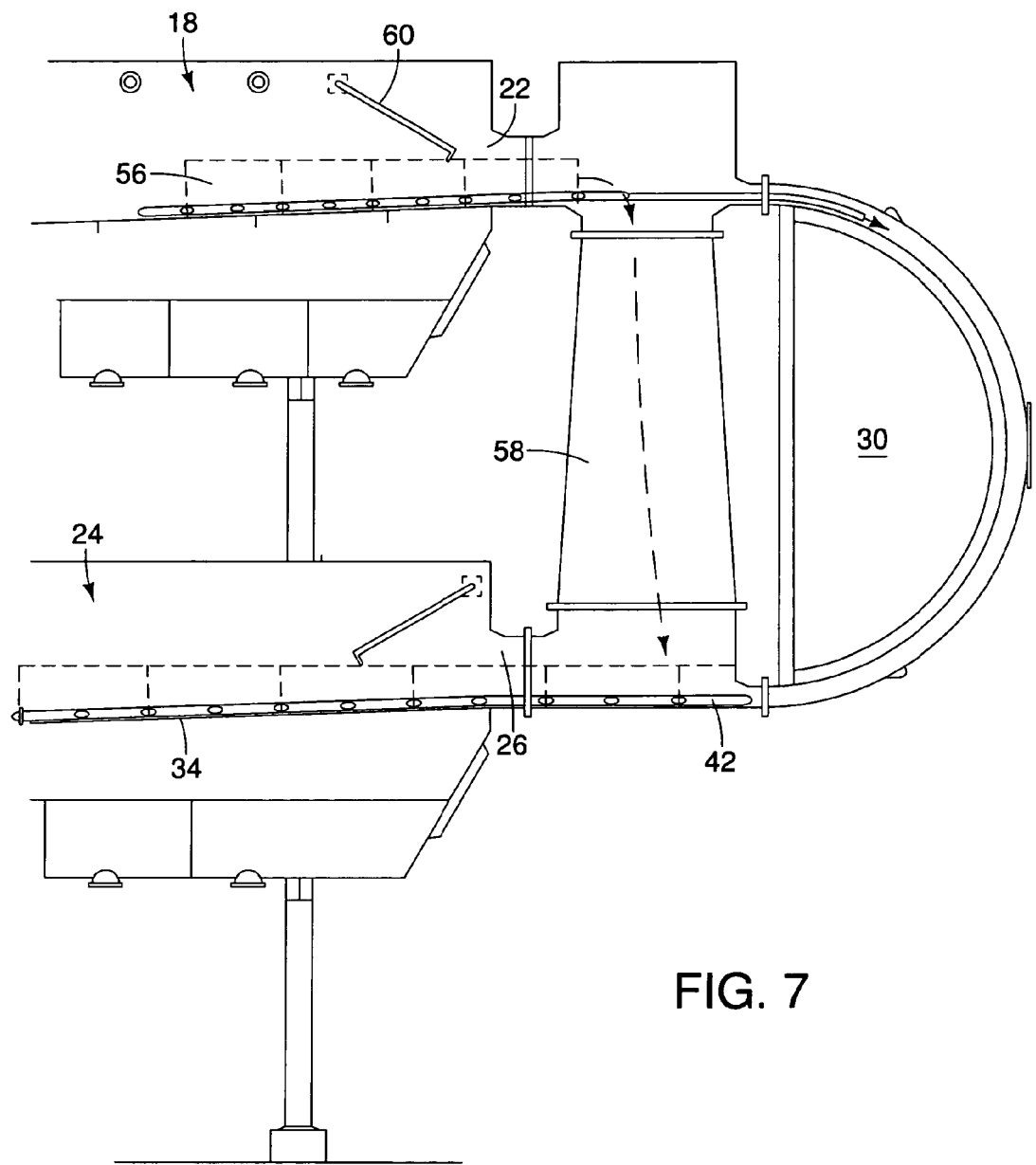
FIG. 7 is a cross-sectional side view of the elbow.

In the embodiment illustrated in FIG. 7, the oleaginous material (56) from which vegetable oil is being extracted is transferred from the upper deck (18) to the lower deck (24) before it reaches the elbow (30). This transfer is affected by positioning a chute (58) adjacent the downstream (22) of the upper deck (18). The chute (58) extends in a substantially vertical manner between the downstream end (22) of the upper deck (18) and the upstream end (26) of the lower deck (24). Accordingly, the material being extracted and forwarded by the chain assembly (42) drops over the edge of upper deck (18) through the chute (58) and onto the lower deck (24). The chute (58) allows a reconstruction of the meal bed, which improves or restores the percolation in the lower deck. In typical solvent extractors, the wet meal is usually pushed through the elbow when travelling from the upper deck to the lower deck, wherein the portion that made up the upper portion of the material bed as it was pushed along the upper deck becomes the lower portion of the material bed after it is pushed through the elbow and onto the lower deck. This causes a problem, because as the oil being extracted has percolated to the bottom of the material bed as it travels along the upper deck, this oil must then re-percolate through the material bed after being pushed around the elbow because the percolated oil is now at the top of the material bed as it travels along the lower deck. Advantageously, by allowing the wet meal to fall through the chute (58) at the downstream end (22) of the upper deck (18), the oil that has percolated through the material bed as it travels along the upper deck (18) remains at or near the bottom of the material bed (56) as it enters the lower deck (24).

As shown in FIG. 7, the bed of material (56) can be leveled by a floating rake (60). The floating rake (60) can improve leveling by fitting a series of ploughshares on a beam across the material (56). This beam (64) can be perpendicular to the direction of movement of the chain assembly (42) but when the ploughshares (62) have a slight angle of up to 20° with respect to the perpendicular, the leveling of the bed material (56) is more complete. The floating rake (60) acts as a dam by lifting a portion of the material (56) from the bed to form a slight bump or revolving lump of material extending along the width of the housing (12). Because of this collection of material created by the floating rake (60), any miscella sprayed onto the top surface of the material bed is dammed up between the register plate (54) and the floating rake (60) such that the miscella is prevented from simply flowing over the edge and into the chute (58) as the material (56) falls from the upper deck (18) to the lower deck (24).

Figure 8:
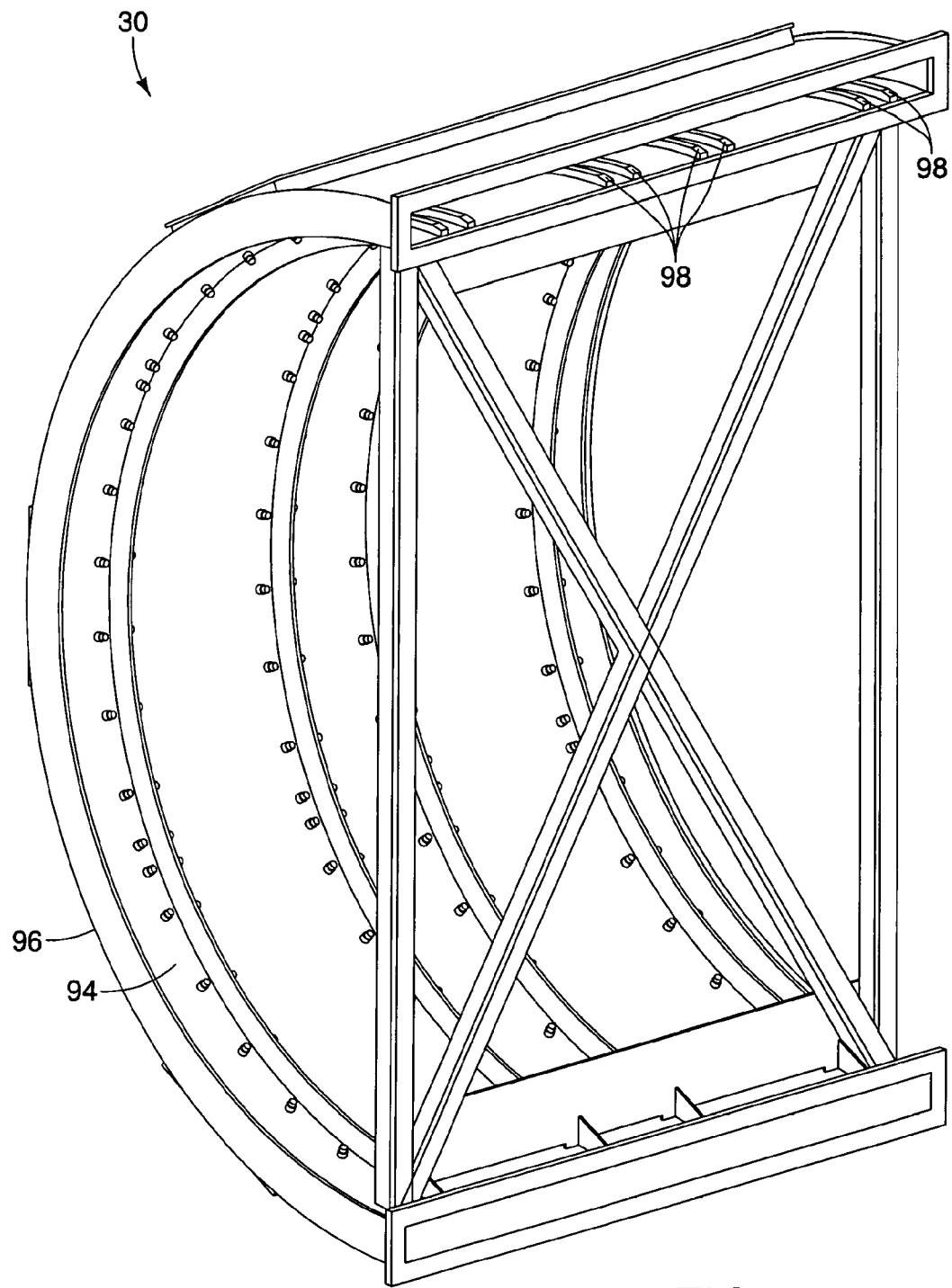
FIG. 8 is a top perspective view of an embodiment of an elbow.

After the material (56) is transferred from the upper deck (18) to the lower deck (24) through the chute (58), the chain assembly (42) continues the circuit through the elbow (30). As shown in FIG. 8, the elbow (30) is a semi-circular member having radius of curvature extending between the downstream end (22) of the upper deck (18) to the upstream end (26) of the lower deck (24). The elbow (30) includes an inner surface (94) and an outer surface (96), wherein the outer surface (96) is oriented in a concentric manner relative to the inner surface (94) such that the outer surface (96) is spaced-apart radially outward from the inner surface (94). The elbow (30) further includes at least two spaced apart pairs of rails (98). Each pair of rails (98) extends radially outward from the inner surface (94), and each rail (98) is spaced apart from the other rail of the pair in a lateral manner. In embodiments having a chain assembly (42) that includes two chains (44), there are two pairs of rails (98)—one pair of rails for each chain; in a similar manner, in embodiments having a chain assembly that includes three chains (44), there are three pairs of rails (98). It should be understood by one of ordinary skill in the art that the number of pairs of rails (98) should be equivalent to the number of chains (44) in the chain assembly (42).

As the chain assembly (42) travels through the elbow (30), the tension in the chain assembly (42) pulls the chains (44) toward the inner surface (94) of the elbow (30) such that each chain (44) contacts the corresponding pair of rails (98). Each pair of rails (98) contacts a corresponding pair of bushings (52) that are positioned on opposing sides of the links (48) connected by the pin (50) extending through the links (48) and bushings (52). As the chains (44) contact the rails (98), the bushings (52) are configured to rotate about the pin (50), and the links (48) are spaced apart from the inner and outer surfaces (94, 96) such that the links (48) do not contact any part of the elbow (30). Accordingly, the chains (44) travel through the elbow (30) without addition friction that would otherwise be generated if the links slid in contact with the elbow (30). The rotation of the bushings (52) also does not increase the tension of the chains, yet reduces the overall force needed to rotate the chain assembly (42) through the circuit of the housing (12).

To extract oil from the oil-bearing material, solvent is sprayed onto the bed of material (56) containing the oil-bearing material. As the oil-bearing material (56) travels along the upper and lower decks (18, 24), a solvent is sprayed over the top of the material bed such that the solvent flows downwardly through the wet material and the solvent is configured to separate the oil from the meal. The oil/solvent fluid (otherwise referred to as miscella) that percolates through the material bed exits the bottom of the material bed, passes through the gaps (38) between the bars (36) of the floor (34) of the upper and lower decks (18, 24), and is subsequently collected below the floors (34). In an embodiment, a trough (70) is positioned below the floor (34) of both the upper and lower decks (18, 24), as shown in FIGS. 3-4. The troughs (70) are configured to collect the miscella that has percolated through the material bed (56). As best seen in FIGS. 3-4, each trough (70) is an elongated structure having a triangular cross-sectional shape that extends between the upstream and downstream ends of the upper and lower decks. It should be understood by one of ordinary skill in the art that the trough can have any cross-sectional shape. A plurality of separators (72) are disposed with each trough (70) to separate the trough into a plurality of hoppers (74), and each hopper (74) is fluidly separated from each other. In an embodiment, the troughs (70) are sloped downwardly from the upstream ends of the upper and lower decks to the downstream ends thereof. In another embodiment, the troughs (70) are aligned in a substantially parallel manner relative to the upper and lower decks (18, 24). It should be understood by one of ordinary skill in the art that the troughs (70) can be arranged at any orientation sufficient to receive the miscella exiting the wet material (56).

As shown in FIGS. 3-4, an exit port (76) is located at the bottom of each hopper (74). Each exit port (76) is configured to allow the miscella to exit the hopper (74) to either be re-circulated and sprayed onto the material bed or to be removed and processed to separate the oil from the solvent. In an embodiment, a circulating pump (78) (FIG. 1) is operatively connected to each exit port (76) to remove the miscella from the hoppers (74), as shown in FIG. 1. The circulating pump (76) operatively connected to the exit port (76) of the hopper (74) located adjacent the upstream end (20) of the upper deck (18) is configured to transfer the miscella from the hopper (74) to a storage or processing tank (not shown) for separating the oil from the other liquids and solids. It should be understood by one of ordinary skill in the art that the miscella may includes oil removed from the meal, solvent, and particles of the meal that fall through the gaps (38) between the bars (36) of the floors (34).

The solvent and solvent/oil mixture are sprayed over the top of the material bed in a counter-current manner as the wet material travels along the upper and lower decks (18, 24). For example, the concentration of extracted oil relative to solvent increases from a small oil-to-solvent ratio collected in the hopper (74) adjacent to the outlet (66) to a significantly large oil-to-solvent ratio collected in the hopper (74) adjacent to the feed inlet (40). In an embodiment, each of the circulating pumps (76) is operatively connected to a sprayer (80) located immediately upstream therefrom. In other words, the hopper (74) located immediately adjacent to the outlet (66) is operatively connected to the sprayer (80) positioned above the material bed just upstream therefrom. The circulating pumps (76) are configured to remove the miscella from a hopper (74) through the exit port (76) by way of a tube or other conduit and transport the miscella through another tube or conduit to a sprayer (80). The sprayers (80) are located within the housing (12) and positioned above the wet material (56) and spray the miscella onto the material (56) travelling along the upper and lower decks (18, 24). In an embodiment, the sprayer (80) immediately upstream from the outlet (66) is configured to spray clean solvent onto the material (56) therebelow, whereas the sprayer (80) immediately downstream from the feed inlet (40) is configured to spray miscella having the highest concentration of oil relative to solvent onto the material (56) therebelow. This counter-current manner of spraying aides in removing the maximum amount of oil from the meal because fresh solvent is sprayed over the material nearest the outlet (66) because nearly all of the oil has been separated from the meal and the fresh solvent removes as much of the remaining oil in the material as possible. The fresh solvent should be more effective at removing any remaining oil at the end of the cycle than at the beginning.

Figure 9:
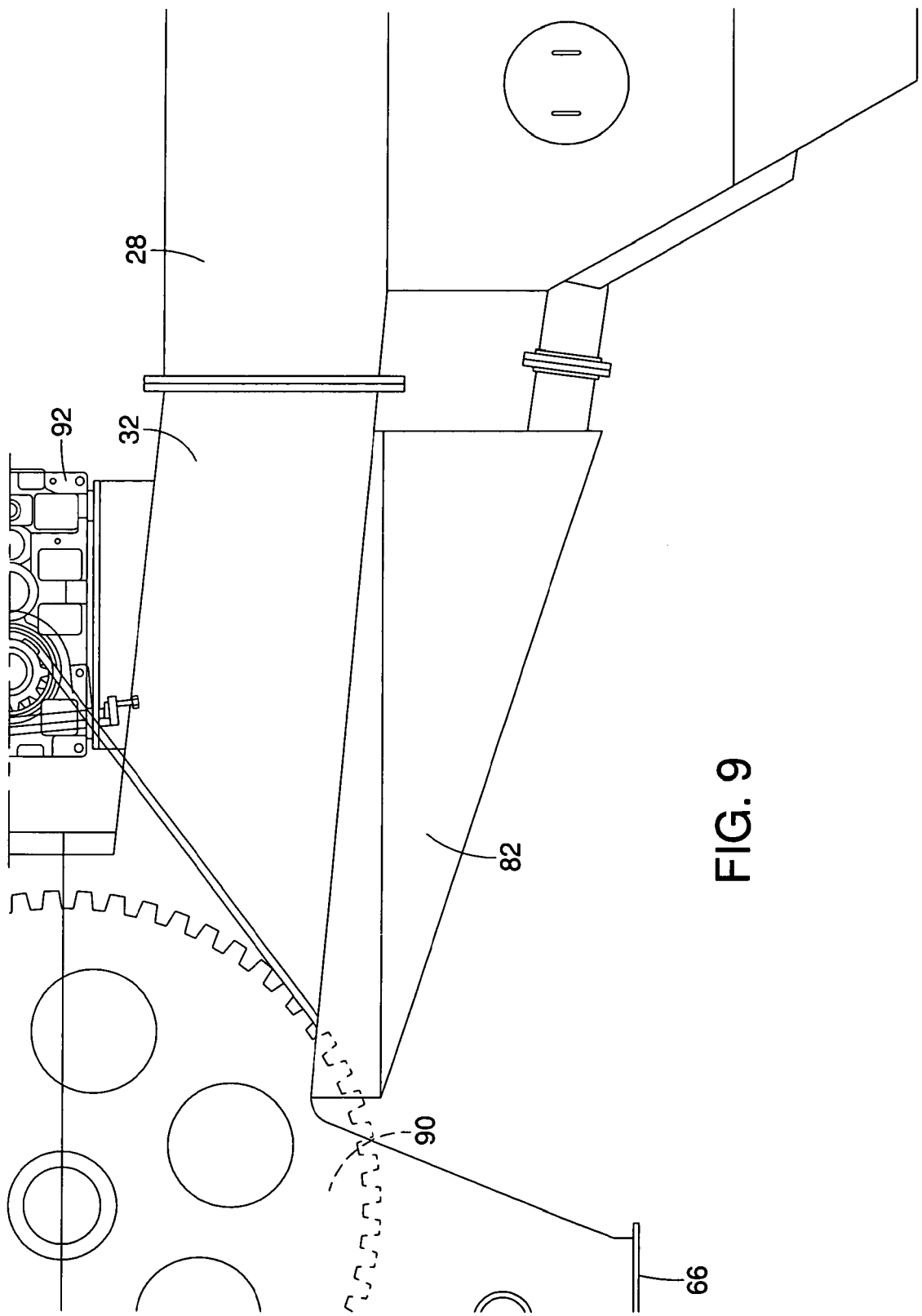
FIG. 9 is a magnified side view of a drainage section.

In the exemplary embodiment illustrated in FIG. 9, a drainage section (82) is positioned immediately adjacent and upstream relative to the outlet (66) of the lower deck (24). The drainage section (82) is configured to reduce the solvent content of the material before the material is finally discharged through outlet (66) for subsequent desolventisation. Just before the material enters drainage section (82), the material is sprayed with oil-free solvent as obtained by distillation but no further solvent is sprayed onto the material in the draining section (82). Accordingly, the flow rate of the hexane through a given surface area of material in the draining section (82) is lower than in the extraction sections further upstream. This may cause fines present in the solvent passing through the drainage section (82) of the lower deck (24) to deposit in the drainage solvent hopper (74) by sedimentation. For this reason the slope of the bottom of the drainage solvent hopper (74) is preferably oriented at more than 20° or more preferably more than 30° with respect to horizontal.

To enhance the rate and extent of drainage, an embodiment of the drainage section (82) includes the creation and maintaining of a pressure differential across the material being transported along drainage section (82). To create the pressure differential, a vacuum is applied under the material bed from below the floor (34). The downwardly-directed vapor flow created by the vacuum causes additional drips of residual solvent to drip down through the material bed. In an embodiment, shown in FIG. 10, the pressure differential can be generated by a fan (84) positioned within the drainage section (82). The fan (84) suction connection can be located below the material bed, wherein a vacuum is created to reduce the pressure under the material relative to the pressure above the material. In this embodiment, the hopper (74) of the drainage section (82) is fluidly separated from the other hoppers (74) of the lower deck (24) due to the pressure differential that would otherwise cause the miscella in the other hoppers (74) to be drawn toward the drainage section (82).

In another embodiment, the drainage section (82) does not provide a pressure differential through the material, so the drainage section (82) is configured to provide an additional section along which miscella can be drained from the material. In yet another embodiment of the apparatus according to the invention involves creating and maintaining a pressure differential over the material being transported along the drainage section (82) using vapor ducts leaving drainage hopper (74) that are connected to liquid eductors that are incorporated in the piping connecting a circulating pump 78 to a sprayer (80).

In general, the low layer solvent extractor (10) according to the invention will be operated at a temperature that is just below the atmospheric boiling point of the extraction solvent or its azeotrope with water. Lowering the pressure in drainage hopper (74) will therefore cause the solvent to start to boil. This is to be avoided by limiting the pressure decrease. Similarly, increasing the pressure above the bed of material being extracted may cause solvent vapors to condense. This is also to be avoided by limiting the pressure increase.

Figure 10:
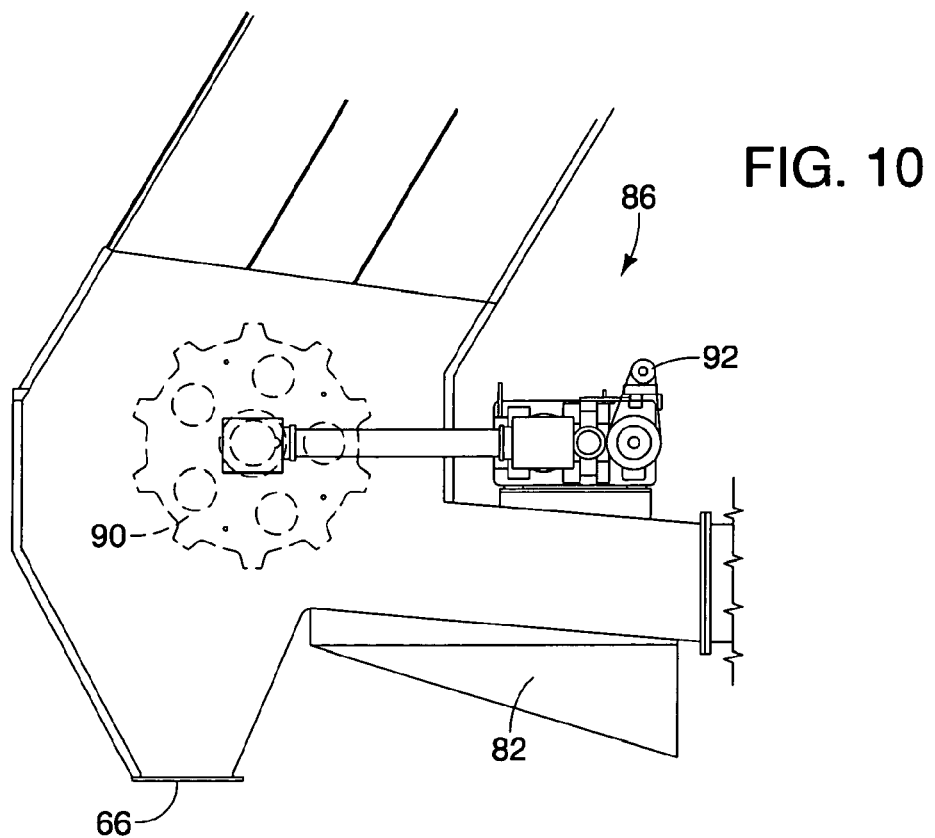
FIG. 10 is a side view of a drive mechanism, drainage section, and return.
Figure 11:
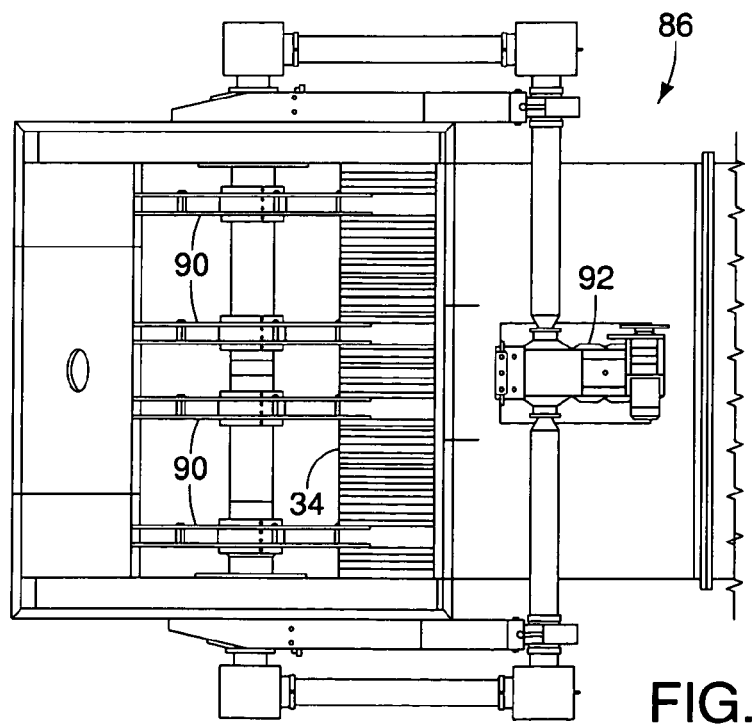
FIG. 11 is top view of the drive mechanism shown in FIG. 10.

Turning now to FIGS. 10-11, after the chain assembly (42) has moved past the outlet (66), the chain assembly (42) is connected to the drive system (86). The drive system (86) includes a drive motor (92) operatively connected to a shaft (99) onto which a plurality of drive sprockets (90) are mounted. The drive motor (92) is operatively connected to the shaft (99), thereby providing power that causes the shaft (99) to rotated resulting in the drive sprockets (90) to rotate about the shaft (99). In an embodiment, the drive system (86) includes four drive sprockets (90). In another embodiment, shown in FIG. 11, the drive system (86) includes eight drive sprockets (90). It should be understood by one of ordinary skill in the art that the drive system (86) includes at least twice as many drive sprockets (90) as there are chains (44) in the chain assembly (42), wherein each pair of drive sprockets (90) engage and are configured to drive a single corresponding chain (44). In an embodiment, torsional forces on the shaft can be reduced by using a double cardan drive. This has also the advantage of a better spread of the pulling force on the chain assembly (42). In yet another embodiment, the housing (12) is recessed behind the main shaft connecting drive sprockets (90) which makes it possible to situate the drive system (86) in between drive sprockets (90). But the invention is not limited to the use of a cardan drive but may also include a single or double sided chain drive.

EXAMPLE

To demonstrate the importance of avoiding preferential flows of solvent through the vegetable material being extracted, a series of laboratory experiments was carried out using soybean flakes. A single lot of industrially flaked material was used to ensure uniformity of cell opening during the entire series of experiments and avoid the ROC from being affected by a lack of uniformity.

During a reference experiment, 6 kg of soya bean flakes were placed in a cylinder that had been fitted with a screen bottom with an open area of 30-35%. The bed height reached 65 cm. Four successive amounts of 6 kg hexane with a temperature of 60° C. were sprayed on top of the bed over periods of 10 minutes. Draining periods of 5 minutes were observed between the spraying periods. The sample that had thus been extracted four times with its original own weight of hexane had a residual oil content (ROC) of 1.04% by weight.

To demonstrate the effect of repositioning the flakes with respect to each other, the above experiment was repeated, but after two amounts of hexane had been administered, the column contents were transferred into another column where they were subjected to two further hexane washes. This transfer reduced the ROC of the sample that had been extracted with four times its own weight of hexane to 0.093% by weight.

Increasing the number of extractions from four to six reduced the ROC to 0.65% by weight for the reference and to 0.63% by weight for the experiment in which the column contents were transferred halfway the experiment. This indicates that an increase in the number of extractions reduces the ROC and also eliminates the favorable effect of repositioning the flakes.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

The invention claimed is:

1. A low layer solvent extractor comprising:
    a housing (12);
    an upper deck (18) and a lower deck (24) located within said housing (12), wherein said upper deck (18) has a first upstream end (20) and a first downstream end (22) and said lower deck (24) has a second upstream end (26) and a second downstream end (28);
    an elbow (30) located within said housing (12), said elbow (30) extending between said first downstream end (22) and said second upstream end (26);
    a return (32) located within said housing (12), said return (32) operatively extending between said first upstream end (20) and said second downstream end (28), and said upper deck (18), said elbow (30), said lower deck (24), and said return (32) form a loop;
    a feed inlet (40) positioned adjacent to said first upstream end (20), wherein oleaginous material (56) is introducible to said upper deck (18) through said feed inlet (40);
    a chute (58) operatively connecting said upper deck (18) and said lower deck (24), wherein said oleaginous material (56) is transferrable from said upper deck (18) to said lower deck (24) through said chute (58);
    an outlet (66) positioned adjacent to said second downstream end (28), wherein said oleaginous material (56) exits said housing (12) through said outlet (66);
    a chain assembly (42) disposed along said loop for guiding said oleaginous material (56) between said feed inlet (40) and said outlet (66);
    a drive system (86) operatively connected to said chain assembly (42) for driving said chain assembly (42) about said loop; and
    a register plate (54) located within said housing (12) and positioned above said oleaginous material (56) in said upper deck (18) adjacent to said feed inlet (4), said register plate (54) configured to level said oleaginous material (54) introducible into said housing (12).

2. The low layer solvent extractor of claim 1, wherein said upper deck (18) and said lower deck (24) include a floor (34) on which said oleaginous material (56) is positionable within said housing (12).

3. The low layer solvent extractor of claim 2, wherein said floor (34) includes a plurality of substantially parallel-aligned bars (36).

4. The low layer solvent extractor of claim 3, wherein laterally adjacent bars (36) are spaced-apart to form a gap (38) therebetween.

5. The low layer solvent extractor of claim 3, wherein each of said bars (36) has a substantially triangular cross-sectional shape, and said bars (36) are oriented such that an edge of said triangular cross-sectional shape is directed upwardly for supporting said oleaginous material (56).

6. The low layer solvent extractor of claim 1, wherein said chain assembly (42) includes a pair of symmetrical, spaced-apart endless chains (44) and a plurality of baffle plates (46) extending between said pair of chains (44), said baffle plates (46) being attached to said chains (44) in a symmetrical manner.

7. The low layer solvent extractor of claim 1 further comprising:
    a plurality of sprayers (80) located within said housing (12) and positioned in a spaced-apart manner above said upper deck (18) and said lower deck (24);
    a trough (70) positioned below said upper deck (18) and another trough (70) positioned below said lower deck (24), wherein said troughs (70) are configured to collect miscella; and
    a plurality of circulating pumps (78), wherein each of said plurality of pumps (78) is operatively connected to a trough (70) and at least one of said plurality of sprayers (80).

8. The low layer solvent extractor of claim 7, wherein each of said circulating pumps (78) fluidly connects one of said troughs (70) to at least one of said sprayers (80) located upstream relative to a location at which said circulating pump (78) is operatively connected to said trough (70).

9. The low layer solvent extractor of claim 7 further comprising at least one separator (72) located within each of said troughs (70) to separate each of said troughs (70) into a plurality of hoppers (74), and at least one of said plurality of circulating pumps (78) is operatively connected to each of said hoppers (74) to fluidly connect said hopper (74) to at least one of said sprayers (80).

10. The low layer solvent extractor of claim 9, wherein each of said hoppers (74) is fluidly connected to at least one of said plurality of sprayers (80) in a counter-current manner.

11. The low layer solvent extractor of claim 1 wherein the register plate (54) is positioned adjacent to said feed inlet (40), and wherein said register plate (54) is vertically adjustable for adjusting a height of said oleaginous material (56) within said housing (12).

12. A low layer solvent extractor comprising:
    a housing (12);

an upper deck (18) and a lower deck (24), wherein said upper deck (18) has a first upstream end (20) and a first downstream end (22) and said lower deck (24) has a second upstream end (26) and a second downstream end (28);

an elbow (30), said elbow (30) extending between said first downstream end (22) and said second upstream end (26);

a return (32), said return (32) operatively extending between said first upstream end (20) and said second downstream end (28), wherein said upper deck (18), said elbow (30), said lower deck (24), and said return (32) form a loop;

a feed inlet (40) positioned adjacent to said first upstream end (20), wherein oleaginous material (56) is introducible to said upper deck (18) through said feed inlet (40);

a chute (58) operatively connecting said upper deck (18) and said lower deck (24), wherein said oleaginous material (56) is transferrable from said upper deck (18) to said lower deck (24) through said chute (58);

an outlet (66) positioned adjacent to said second downstream end (28), wherein said oleaginous material (56) exits said lower deck (24) through said outlet (66); and a chain assembly (42) for guiding said oleaginous material (56) between said feed inlet (40) and said outlet (66), said chain assembly (42) comprising:
  a plurality of endless chains (44) extending along said entire loop; and
  a plurality of spaced-apart baffle plates (46), wherein each baffle plate (46) extends between at least two adjacent chains (44);

a drive system (86) operatively connected to said chain assembly (42) for driving said chain assembly (42) along said loop; and a vertically adjustable register plate (54) positioned adjacent to said feed inlet (40), wherein speed of movement of said chain assembly (42) through said loop and a vertical position of said register plate (54) are adjustable for regulating a height of said oleaginous material (56) within said housing (12).

13. The low layer solvent extractor of claim 12, wherein each of said chains (44) is formed of a plurality of links (48) connected together in an end-to-end manner, and wherein each of said baffle plates (46) is connected to one of said endless chains (44) by a pin (50) extending through said adjacent links (48).

14. The low layer solvent extractor of claim 13, wherein each of said baffle plates (46) is positioned about both opposing sides of said links (48), and a pair of bushing (52) are disposed on said pin (50) on each opposing side of said links (48) between said links (48) and said baffle plate (46), each of said pair of bushings (52) being rotatable about said pin (50).

15. The low layer solvent extractor of claim 14, wherein said drive system (86) comprises a drive motor (92) operatively connected to at least two pairs of drive sprockets (90) and actuation of said drive motor (92) causes said drive sprockets (90) to rotate.

16. The low layer solvent extractor of claim 15, wherein each of said pair of drive sprockets (90) engages said pair of bushings (52) such that rotation of said drive sprockets (90) causes said chain assembly (42) to travel along said loop.

17. The low layer solvent extractor of claim 12, wherein each of said baffle plates (46) is connected to said chains (44) such that said baffle plates (46) are symmetric relative to links (48) of said chains (44).

18. The low layer solvent extractor of claim 12, wherein said elbow (30) includes an inner surface (94) and an outer surface (96) oriented in a spaced-apart, concentric manner and at least two rail pairs (98) attached to said inner surface (94) such that said chain assembly (42) contacts said at least two rail pairs (98) as said chain assembly (42) travels along said elbow (30).

19. The low layer solvent extractor of claim 12, wherein said height of said oleaginous material (56) can be regulated between about six hundred millimeters (600 mm) to about one thousand millimeters (1000 mm).

20. A low layer solvent extractor comprising:
a housing (12);
an upper deck (18) and a lower deck (24), wherein said upper deck (18) has a first upstream end (20) and a first downstream end (22) and said lower deck (24) has a second upstream end (26) and a second downstream end (28);
an elbow (30), said elbow (30) extending between said first downstream end (22) and said second upstream end (26);
a return (32), said return (32) operatively extending between said first upstream end (20) and said second downstream end (28), wherein said upper deck (18), said elbow (30), said lower deck (24), and said return (32) form a loop;
a feed inlet (40) positioned adjacent to said first upstream end (20), wherein oleaginous material (56) is introducible to said upper deck (18) through said feed inlet (40);
a chute (58) operatively connecting said upper deck (18) and said lower deck (24), wherein said oleaginous material (56) is transferrable from said upper deck (18) to said lower deck (24) through said chute (58);
an outlet (66) positioned adjacent to said second downstream end (28), wherein said oleaginous material (56) exits said lower deck (24) through said outlet (66); and
a chain assembly (42) for guiding said oleaginous material (56) between said feed inlet (40) and said outlet (66);
a drive system (86) operatively connected to said chain assembly (42) for driving said chain assembly (42) about said loop;
a register plate (54) located within said housing (12) and positioned above said oleaginous material (56) in said upper deck (18) adjacent to said feed inlet (4), said register plate (54) configured to level said oleaginous material (54) introducible into said housing (12);
a drainage section (82) located within said lower deck (24) adjacent to said outlet; and
a fan (84) located within said drainage section (82) for generating a pressure differential across said oleaginous material (56) within said drainage section (82).

21. The low layer solvent extractor of claim 20, wherein a hopper (74) of said drainage section (82) is fluidly separated from said hopper (74) of said lower deck (24).

22. The low layer solvent extractor of claim 20, wherein said fan (84) is positioned below said oleaginous material (56) within said drainage section (82).

* * * * *